Patented Sept. 21, 1954

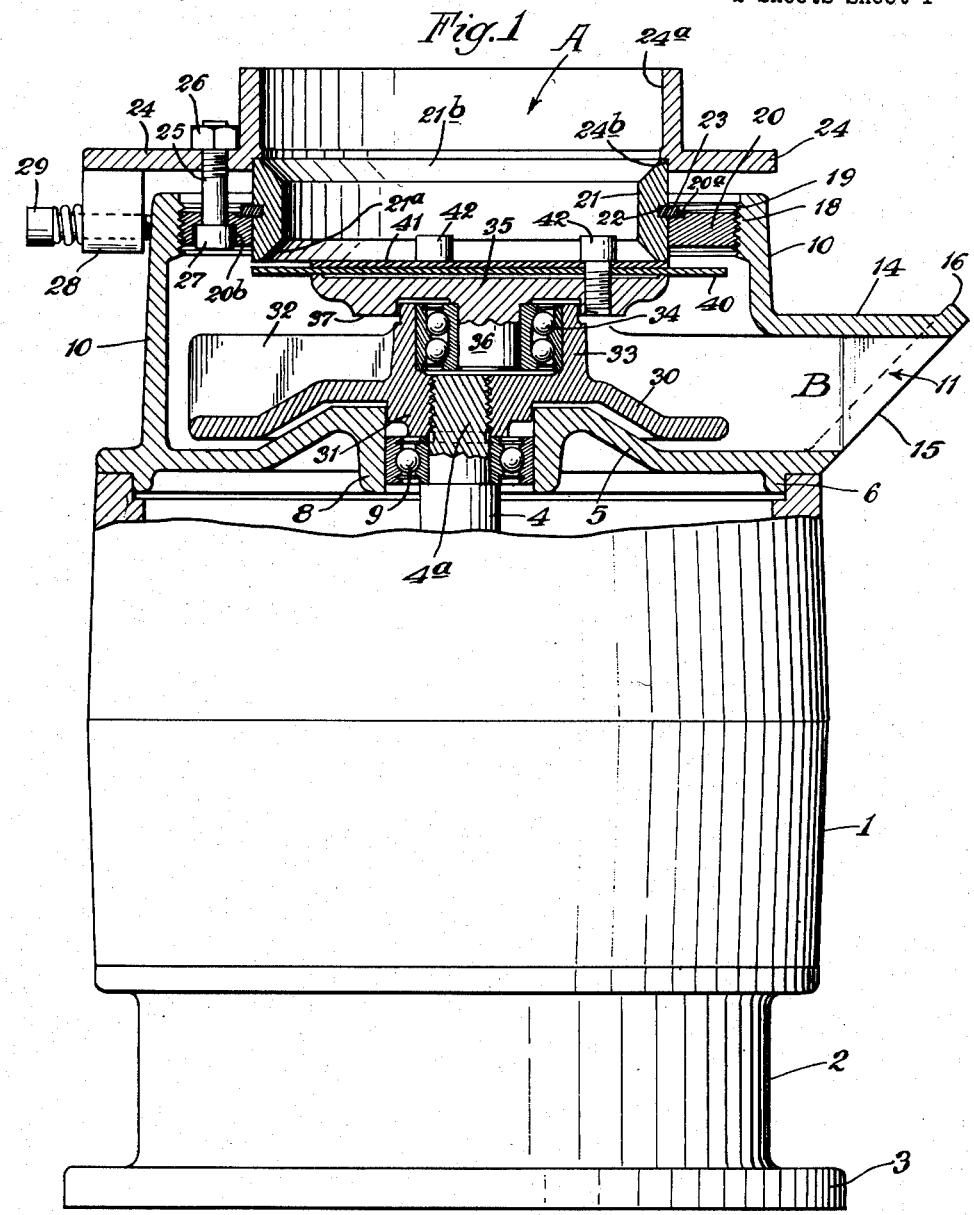

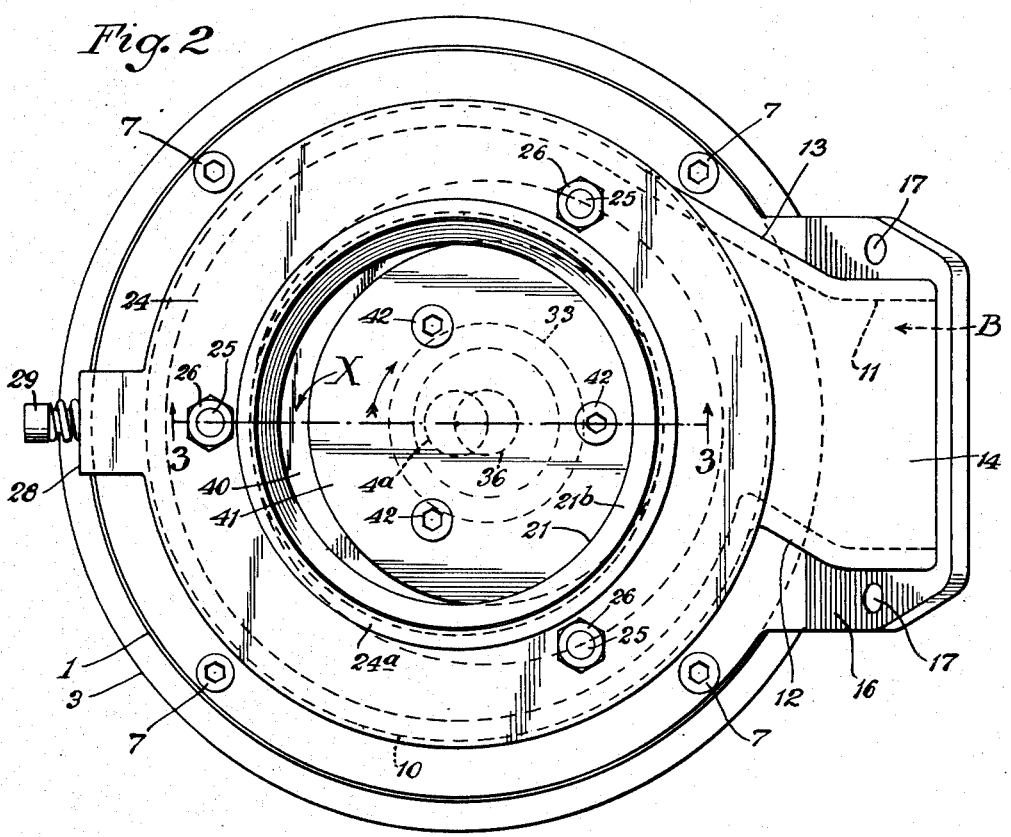

2,689,593

UNITED STATES PATENT OFFICE 2,689,593

GYRATORY GRAIN CUTTER

Edgar P. Symons, Hollywood, Calif.

Application October 19, 1950, Serial No. 191,000

15 Claims. (Cl. 146—71.5)

My invention relates to an improvement in grain cutters and has for one purpose to provide a grain cutter of relatively small size and for use with regular light circuits.

Another purpose is to provide a grain cutter in which the grain is not subjected to rapidly rotating parts.

Another purpose is to provide a grain cutter with a simplified compact assembly.

Another purpose is to provide a grain cutter which can be added to or associated with an electric motor frame.

Another purpose is to provide an improved cutting assembly for grain cutters.

Another purpose is to provide a grain cutter having an improved discharge assembly for the cut grain.

Another purpose is to provide an improved adjustment for a grain cutter.

Another purpose is to provide an improved drive for grain cutters.

Other purposes will appear from time to time in the course of the specification and claims.

The present application describes and claims a grain cutter which obtains the general results of the structure of my copending application, Serial No. 108,565, filed in the United States Patent Office on August 4, 1949, now abandoned, but is particularly adaptable for use as a small unit operable on farm power.

I illustrate my invention more or less diagrammatically in the accompanying drawings wherein Figure 1 is a side elevation with parts broken away and parts in vertical section.

Figure 2 is a plan view of the structure of Figure 1.

Figure 3 is a section on an enlarged scale on the line 3—3 of Figure 2; and

Figure 4 is a detail.

Like parts are indicated by like symbols throughout the specification and drawings.

Referring to the drawings, I generally indicates the circumferential frame portion or stator of an electric motor. 2 indicates any suitable base which may be secured to one end of the motor frame. The base is so formed that its lower portion 3 may be used as a floor engaging member upon which the grain cutter assembly, as a whole, is supported with the axis of the motor and of the motor shaft 4 generally vertical. 5 is a closure plate for the upper end of the motor frame 1, shown as having a circumferential flange 6 formed and adapted to center it in relation to the motor frame. The parts may be kept removably locked together by any suitable securing means or screws 7, as shown, for example, in Figure 2. The closure plate 5 is shown as having a central hub 8 which surrounds any suitable bearing assembly 9 for the upper reduced end 4a of the motor shaft 4. Upwardly extending from the plate 5, and advantageously formed integrally with it is the generally arcuate side wall 10. This side wall is provided with an aperture 11 bounded by spout or outlet walls 12, 13. The spout portion is covered by an upper wall or extension 14 and the spout as a whole terminates in an inclined edge 15 surrounded by a bounding lip or flange 16 shown as provided with any suitable apertures 17. The upper edge of the wall 10 is shown as having an inward enlargement 18 which is inwardly screw threaded as at 19 to receive the externally screw-threaded adjustment and supporting ring 20. Mounted in the supporting ring is the upper and normally fixed cutting ring 21. It is externally channeled as at 22 to receive the split ring 23, the edge of which engages any suitable seat 20a in the upper, inner edge of the adjusting ring 20. 24 is a combined locking ring and chute having a central aperture surrounded by a circumferential wall 24a. The ring is notched as at 24b to engage the upper outer edge of the cutter 21. The locking ring 24 may be drawn downwardly toward the adjusting ring 20 by any suitable screws or bolts 25 shown as having nuts 26 at the upper ends and being headed at their lower ends as at 27, the heads being received in pockets 20b formed in the lower surface of the adjusting ring 20. The ring 24 is also provided with a downwardly depending lug 28 through which passes the lock bolt 29 which works against the outer surface of the circumferential wall or housing 10 and thus prevents the assembly from rotating in the screw threads, as shown in Figure 1. Thereby the proper adjustment of the cutting ring 21, in relation to the opposed below described moving cutting member, is maintained.

I mount a cutting assembly upon the upper end of the shaft 4 which includes a gyrated cutting member. 30 generally indicates a rotor in the form of an upwardly convex disc. This rotor has a hub 31 screw threaded to the upper end 4a of the motor shaft 4. It also carries one or more vanes or fan blades 32. Under most circumstances, a single blade is adequate but more may be employed. Thus the material which passes between the cutters is positively blown out through the outlet passage generally indicated at B in Figures 1 and 2. The rotor 30 includes an eccentric hub 33, the hub being eccentrically apertured. Within the aperture is any suitable bearing assembly 34 which surrounds the stub shaft 36 which extends downwardly from the lower surface of the cutter supporting plate 35. The plate 35 also has a circumferential downwardly extending annular lug 37 which depends about the circumferential surface of the hub 33. Positioned upon the upper surface of the supporting plate 35 is a disc 40. It is preferably of such size that at all positions of the cutting assembly its outer edge underlies the ring 21. Thus in Figure 1 at the left side, one limit of movement of the plate 40 is indicated, the other movement being indicated at the right side of Figure 1. Thus grain which is admitted downwardly through the central upper feeding space A builds up upon the plate 40 or upon the upper cutter plate 41 which is positioned concentrically with it. The two plates may be secured to the supporting plate 35, for example, by any suitable screws 42.

The upper plate 41 constitutes the actual cutter member and the parts are so adjusted that the plate 41 has its upper surface at all times in proper cutting relationship with the opposed lower surface of the fixed cutter ring 21. This adjustment is made by adjusting the ring 20 which supports the cutter ring 21. As will be clear from Figures 1 and 2, the cutter ring is inwardly beveled at its upper and lower edges as at 21a and 21b. It will be understood that the cutter ring 21 may be readily be inverted if and when one edge becomes worn.

It will be realized that whereas I have described and claimed a practical and operative device, nevertheless many changes may be made in size, shape, number and disposition of parts without departing from the spirit of my invention. I therefore wish my discription and drawings to be taken as in a broad sense illustrative or diagrammatic rather than as limiting me to my precise showing herein. For example, while I may find it advantageous under most circumstances to include the motor frame directly as part of my assembly, I wish it to be understood that my drive for the cutter assembly and my adjustment for the cutter parts may be independently employed.

The use and operation of my invention are as follows:

While my cutter may be used in a variety of sizes, it lends itself particularly for use in small sized grain cutters which may include or be driven by motors small enough to be operated for regular or domestic light circuits.

This in practice limits the amount of power that can be used to about three-fourths horse power, any machine using more than this generally requiring special wiring. The structure as shown in Figure 1 may include a conventional vertical three-fourths horse power motor. The top assembly herein shown is substituted for the usual end bell of the motor bearing assembly. The bearing assembly 34 may, for example, be located about three-eighths inches outwardly of the axis of the motor shaft 4. The bearing 34 is shown as of the so called rigid type bearing, and is designed to take thrust and radial loads as well as twist or angular loads. The spit or snap ring 23 holds the upper or fixed cutter ring 21 in proper parallelism with the lower or moving cutter ring or disc 41. In operation the grain to be cut is fed downwardly through the space A surrounded by the chute or spout 24a and the ring 21. The device may be choke fed and the entire cavity may be filled with grain awaiting cutting. This mass rests, by gravity, upon the upper surface of the ring 41 and in part of the ring 40. When the cutting edge of the upper ring 41 is drawn away from the lower edge of the ring 21 as shown at X in Figure 2, a portion of the edge part of the upper surface of the ring 40 is exposed and supports the grain. This relationship is shown, for example, in Figure 3. But the exposed crescent of the lower ring 40 moves rapidly about the cutting space. The motor shaft may, for example, be operated at 1800 R. P. M. in the direction of the arrow of Figure 2. This carries the axis of the stub 36 rapidly about the axis of the shaft 4. The edge of the upper or cutter ring or disc 41 is thus carried rapidly about the cutting space and the grain, gauged by the thickness of the disc or plate 41, is cut and discharged into the space below the plate 35. The rapid rotation of the vane or fans 32 feeds the cut grain rapidly outwardly through the outlet B to be received in any suitable sack or container which may be secured to and may be positioned below the lip 15 of the outlet.

The entire upper cavity or space A may be choke fed with grain. The eccentric gyration of the cutter assembly, and the heads of the cap screws 42 keep the material loosened up and fed outward. There is little or no rotation of the discs 40, 41. The gyration of the moving part of the cutting assembly simply moves the cresent X around the lip of the fixed cutter ring 21.

Since there is no centrifugal feed, the mass is not compact and there is a minimum of packing along the shearing edge. Both the fixed ring 21 and the top gyrated plate 41 can be reversed when worn. It is also a simple matter to replace the cutting parts from time to time. Whereas I have illustrated the rings or plates 40, 41 as separate parts, it will be understood that I may make them in a single piece. When they are made in two pieces, there is the advantage that both can be reversed as their edges wear. Figure 4 illustrates the cutter plate 41 after it has been reversed, one edge having been blunted and a second edge being still sharp. Various sized cuts can be made by supplying different thicknesses of cutter discs. It will be also understood that it will be advantageous to harden the outer or cutting edges of the cutter elements to extend their effective life. I find it advantageous to bevel both edges of the fixed cutter ring 21. As will be clear from Figure 3, the bevel or overhang is advantageous in providing a limited zone in which the particles being cut are held in proper position for the shearing action of the cutting edge of the plate 41. Figure 3 also illustrates how the plate 41 acts as a gauge, the gauged particles being illustrated as escaping from the cutting zone, and being illustrated at the right side of Figure 3.

I claim:

1. In a grain cutter, a feed-receiving chamber element including a circumferential wall, a rotor mounted for rotation about a generally vertical axis, said rotor being below the bottom of said chamber and in vertical alignment with the chamber, a gyratory cutting assembly eccentrically mounted on said rotor for rotation about a vertical axis eccentrically offset from the vertical axis of the rotor, said cutting assembly being positioned to close the otherwise open bottom of said chamber, said cutting assembly including a circumferentially extending gauge component and a cutting component having a cutting edge spaced inwardly from the outer edge of the gauge component, and spaced upwardly from its upper surface a normally fixed cutting ring about the bottom of said chamber, said ring having a circumferential cutting edge portion opposed to the cutting edge of the gyratory cutting assembly whereby in response to gyration of said cutting assembly a point of cutting engagement between said cutting edge and said circumferential cutting edge portion moves circumferentially about said cutting surface, with an edge portion of the cutting component overlapping and extending radially outwardly below and beyond said circumferential cutting edge portion of the fixed cutting ring.

2. The structure of claim 1 characterized in that the cutting assembly includes a gauging disc of a diameter greater than the diameter of the circumferential cutting surface of the normally fixed cutting ring whereby the gauging ring underlies the space between the circumferential cutting surface of the fixed cutting ring and the circumferential cutting edge of the cutting component of the cutting assembly at all positions of inward withdrawal of the cutting edge of the cutting component.

3. The structure of claim 1 characterized in that the gauge component and the cutting component of the cutting assembly are individually removable and replaceable.

4. The structure of claim 1 characterized in that the cutting assembly is removable and replaceable.

5. The structure of claim 1 characterized by and including means for adjusting the normally fixed cutting ring and the cutting assembly toward and away from each other.

6. The structure of claim 1 characterized in that the normally fixed cutting ring is reversible.

7. The structure of claim 1 characterized in that the normally fixed cutting ring has a downwardly and outwardly inclined conic surface overlying the space immediately within its cutting surface.

8. The structure of claim 1 characterized by and including a housing member positioned about a lower portion of the rotor and beneath the gyratory cutting assembly and formed and adapted to receive cut material, said housing member having a peripheral discharge outlet.

9. The structure of claim 1 characterized by and including a housing member positioned about a lower portion of the rotor and beneath the gyratory cutting assembly and formed and adapted to receive cut material, said housing member having a peripheral discharge outlet, the rotor having one or more air vanes positioned within said housing member and formed and adapted to eject air and cut material through said peripheral outlet.

10. In a grain cutter, a feed receiving chamber element including a circumferential wall, a normally fixed cutting ring adjacent and about the bottom of the space surrounded by said circumferential wall and a gyratory gauging and cutting element positioned beneath and in vertical alignment with the space surrounded by said ring and wall and positioned and adapted to close the otherwise open bottom of said space, and means for gyrating said gauging and cutting element.

11. In a grain cutter a generally upright feed-receiving chamber, a vertically axised rotor mounted for rotation about an axis located below and in vertical alignment with the feed-receiving chamber, a gyratory cutting assembly eccentrically mounted on said rotor for rotation about a vertical axis eccentrically offset from the vertical axis of the rotor, the cutting assembly including a circumferentially extending gauging component and a cutting component having a cutting edge spaced radially inwardly from the outer edge of the gauging component, a normally fixed cutting ring about the bottom of said feed-receiving chamber, said ring having a cutting edge opposed to the cutting edge of the gyratory cutting assembly whereby in response to gyration of said cutting assembly a point of cutting engagement between the two cutting edges moves circumferentially about the normally fixed cutting edge.

12. In a grain cutter a circumferential wall member through which grain to be cut may pass, a normally fixed circumferentially extending cutter ring located adjacent the bottom of said housing and a moving cutter member positioned therebelow and means for gyrating it, said movable member including a circumferential gauging portion formed and adapted at all times to underlie the cutting edge of the cutter ring and a cutting portion having a cutting edge spaced inwardly and upwardly therefrom, and positioned and proportioned to extend adjacently beneath and radially outwardly beyond the cutting edge of the fixed cutter ring, in the course of the normal cutting operation.

13. In a gyratory grain cutter a feed hopper having a generally cylindrical portion and an outwardly flared bottom portion terminating in a normally fixed circumferential cutting edge, and a movable cutting member including a gauging portion at all times underlying said cutting edge and a cutting portion having a circumferential cutting edge spaced upwardly from the gauging portion, and positioned and proportioned to extend adjacently beneath and radially outwardly beyond the cutting edge of the fixed cutter ring, in the course of the normal cutting operation, and means for gyrating said gauging and cutting portions and for thereby carrying a zone of cutting contact between the fixed and moving cutting edges rapidly about the fixed cutting edge, with an edge portion of said cutting portion overlapping and extending beneath the fixed circumferential cutting edge.

14. In a grain cutter, a motor and a housing therefor, said motor housing being formed and adapted to serve as a base for the grain cutter and having a bottom surface portion formed and adapted to rest upon a horizontal floor or the like, a cover element for said housing centrally apertured to receive the upwardly projecting end of the shaft of the motor, a rotor mounted upon the upper end of the shaft, said cover member having side elements constituting an upper housing within which said rotor is movable, said upper housing having mounted therein a fixed cutting ring, a feed member mounted upon said cutting ring, the feed member and cutting ring being upwardly open, whereby material may be delivered downwardly into and through the feed member and cutting ring, and a gauging and cutting element mounted for rotation on said rotor about an axis spaced from the axis of rotation of the rotor, the two axes being parallel and generally upright, said element having a horizontal, circumferential plate portion which, at all positions of the rotor and element, underlies the entire circumference of the cutting ring, said element having also a cutting projection upstanding therefrom and spaced radially within the edge thereof, said cutting projection having a circumferential cutting surface opposable to and extending beneath the cutting ring in a zone of engagement which, in response to rotation of the rotor, moves around the cutting ring.

15. In a grain cutter, a feed receiving, open-topped chamber element including a circumferential wall, a normally fixed cutting ring adjacent and about the bottom of the space surrounded by said circumferential wall, and a gyratory gauging and cutting element positioned beneath and in vertical alignment with the space surrounded by said ring and wall and adapted to close the otherwise open bottom of said space, said gyratory gauging and cutting element having a horizontal, circumferential plate portion which, at all positions of the gauging and cutting element, underlies the entire circumference of the edge of the cutting ring, said gauging and cutting element having a cutting projection upstanding from said circumferential plate portion and spaced radially within the edge thereof, and having a circumferential cutting surface opposable to and extending beneath the cutting ring in a zone of engagement which, in response to gyration of the gauging and cutting element, moves around the cutting ring.

References Cited in the file of this patent

UNITED STATES PATENTS

| Number | Name | Date |
|---|---|---|
| 29,010 | Ruof et al. | July 3, 1860 |
| 192,208 | Wilson | June 19, 1877 |
| 220,111 | Baker | Sept. 30, 1879 |
| 315,143 | Hudson | Apr. 7, 1885 |
| 326,264 | Browne | Sept. 15, 1885 |
| 715,504 | Pendelton | Dec. 9, 1902 |
| 905,492 | Bauer | Dec. 1, 1908 |
| 1,051,338 | Landes | Jan. 21, 1913 |
| 1,057,427 | Higbee | Apr. 1, 1913 |
| 1,127,101 | Smith | Feb. 2, 1915 |
| 1,269,399 | Davis | June 11, 1918 |
| 1,405,878 | Torrance | Feb. 7, 1922 |
| 1,670,714 | Craig | May 22, 1928 |
| 1,719,784 | Ross | July 2, 1929 |
| 2,121,275 | Zober | June 21, 1938 |
| 2,126,361 | Urschel et al. | Aug. 9, 1938 |
| 2,172,704 | Gentilli | Sept. 12, 1939 |
| 2,405,561 | Egedal | Aug. 13, 1946 |
| 2,467,938 | Kennedy | Apr. 19, 1949 |

FOREIGN PATENTS

| Number | Country | Date |
|---|---|---|
| 21,928 | Germany | May 18, 1883 |
| 539,977 | Germany | Dec. 7, 1931 |
| 603,679 | Great Britain | June 21, 1948 |